United States Patent [19]
Ando et al.

[11] Patent Number: 5,094,474
[45] Date of Patent: Mar. 10, 1992

[54] SUSPENSION SYSTEM FOR A VEHICLE

[75] Inventors: Fumitaka Ando; Toshiro Kondo, both of Hiroshima, Japan

[73] Assignee: Mazda Motor Corporation, Japan

[21] Appl. No.: 622,099

[22] Filed: Nov. 29, 1990

[30] Foreign Application Priority Data

Nov. 29, 1989 [JP] Japan .................................. 1-314081
Nov. 29, 1989 [JP] Japan .................................. 1-314082

[51] Int. Cl.$^5$ .............................................. B60G 3/00
[52] U.S. Cl. ............................. 280/691; 280/675; 280/701
[58] Field of Search ............... 280/688, 690, 691, 660, 280/666, 668, 96.1, 675, 673, 701

[56] References Cited

U.S. PATENT DOCUMENTS

| 2,866,651 | 12/1958 | Powell | 280/666 |
| 4,715,615 | 12/1987 | Kijima et al. | 280/690 |
| 4,822,073 | 4/1989 | Tanahashi et al. | 280/691 |
| 4,911,467 | 3/1990 | Alesso et al. | 280/691 |

FOREIGN PATENT DOCUMENTS

| 0070025 | 1/1983 | European Pat. Off. | 280/701 |
| 3636883 | 5/1988 | Fed. Rep. of Germany | 280/690 |
| 0139807 | 8/1983 | Japan | 280/701 |
| 0033108 | 2/1985 | Japan | 280/690 |

*Primary Examiner*—Charles A. Marmor
*Assistant Examiner*—Paul Dickson
*Attorney, Agent, or Firm*—Thompson, Hine and Flory

[57] ABSTRACT

A suspension system for a vehicle in which lateral rigidity of a suspension arm member to resist external force in a transverse direction of the vehicle at turning, for example, is increased effectively by an assist link, and rigidity in the longitudinal direction of the suspension arm member to resist external force from the longitudinal direction of the vehicle while running over a rough road, for example, is decreased when the vehicle body side support of the suspension arm member close to the assist link swings in a longitudinal direction, with the vehicle body side support part of a vertical link member acting as a fulcrum. Thus, compliance to the input from the longitudinal direction of the vehicle is ensured fully and comfortableness to ride when running over a rough road, for example, and driving stability at turning, for example, can coexist at a high level.

10 Claims, 10 Drawing Sheets

FIG.10

SUSPENSION SYSTEM FOR A VEHICLE

BACKGROUND OF THE INVENTION

This invention relates to a suspension system for a vehicle having a suspension arm member whose inner end is supported, at two points spaced apart in longitudinal direction of the vehicle body, to a vehicle body member and an assist link fixed thereto. This invention is particularly intended for coexistence of comfortableness to ride in and driving stability.

The Japanese Utility Model Registration Application Laying Open Gazette No. 64-49404, for example, discloses a suspension system of this kind. This suspension system comprises a suspension arm member whose inner end is supported swingably, at two points spaced apart in longitudinal direction of the vehicle body, to a vehicle body member and whose outer end is supported swingably to a wheel support member and an assist link, extending in right and left direction of the vehicle body, whose outer end is supported swingably to an intermediate part of the suspension arm member and whose inner end is supported swingably to a vehicle body member which is on an axial center of the vehicle body side parts are supported elastically to the vehicle body member through the medium of bushes or the like.

In the above case, provision of the assist link extending in right and left direction of the vehicle body heightens effectively the lateral rigidity of the suspension arm member which resists external force from the right and left direction of the vehicle body at turning of the vehicle boyd, for example, and thus driving stability at turning is improved. Provision of the assist link also makes it possible to soften the bush of one of the vehicle body side support parts (vehicle body side support part close to the assist link), whereby input from longitudinal direction of the vehicle body which acts when a vehicle runs over roughness of the road, for example, is let escape by moving the wheel positively in front and rear direction and as a result, compliance in front and rear direction is ensured and comfortableness to ride in is improved.

Recently, it has been demanded to make the comfortableness to ride in (when a vehicle runs over roughness of the road, for example) and the driving stability at turning coexist at a high level by ensuring fully compliance in front and rear direction when a vehicle runs over roughness of the road, for example, and input from the longitudinal direction of vehicle body acts, by lowering rigidity in front and rear direction at the vehicle body side support part of the suspension arm member while lateral rigidity of the suspension arm member is in heightened state.

In the above case, however, since the vehicle body side support part of the suspension arm member is supported to the vehicle body member through the medium of a bush or the like, rigidity against input from longitudinal direction of the vehicle body at the vehicle body side support part of the suspension arm member is high. Therefore, even if a bush close to the assist link (out of bushes of two vehicle body side support parts) is made soft, quantity of moving the wheel in front and rear direction against input from longitudinal direction of the vehicle body when a vehicle runs over roughness of the road, for example, becomes very small. Therefore, there is a limit in ensuring compliance when input from longitudinal direction of a vehicle body acts by softness of a bush close to the assist link while securing rigidity against input from lateral direction of the vehicle body at turning. for example, only by the assist link and it is impossible to make the comfortableness to ride in (when a vehicle runs over roughness of the road, for example) and the driving stability at turning coexist.

SUMMARY OF THE INVENTION

The present invention has been made in view of the above demerits and has for its object to make the comfortableness to ride in (when a vehicle runs over roughness of the road, for example) and the driving stability at turning coexist by securing fully the quantity of movement in longitudinal direction of wheel against input from the longitudinal direction of vehicle body for one of the vehicle body side supports parts of the suspension arm member, without lowering lateral rigidity.

In order to attain the above object, the suspension system according to the present invention primarily comprises a suspension arm member whose inner end is supported swingably to a vehicle body member at two points spaced apart in longitudinal direction of the vehicle body and whose outer end is supported swingably to a wheel support member and an assist link, extending in right and left direction of the vehicle body, whose outer end is supported swingably to an intermediate part of the suspension arm member and whose inner end is supported swingably to a vehicle body member on an axis of the vehicle body side support part, in which one of the vehicle body side support parts of the suspension arm member is supported to the vehicle body member through the medium of the link member.

Under the above construction of the present invention, external force from right and left direction of the vehicle body which acts at turning of a vehicle, for example, is supported by the suspension arm member which is heightened effectively in lateral rigidity by the assist link extending in right and left direction of the vehicle body and accordingly driving stability at turning is improved.

In the above case, since one of the vehicle body side support parts of the suspension arm member is supported swingably to the vehicle body member through the medium of the link member extending in vertical direction, if external force from longitudinal direction of the vehicle body acts on the suspension arm member (when a vehicle runs over roughness of the road, for example), the vehicle body side support part of the suspension arm member close to the assist link swings in longitudinal direction, with the vehicle body side support part of the link member as fulcrum. Therefore, rigidity at one of the vehicle body side supporting points of the suspension arm member against input from longitudinal direction of the vehicle body becomes low and accordingly quantity of moving the wheel support member in front and rear direction against input from longitudinal direction of the vehicle body increases, with the result that compliance in front and rear direction is secured fully and comfortableness to ride in (when a vehicle runs over roughness of the road, for example) is heightened effectively.

The above object and novel features of the present invention will be understood more clearly by reading the following description with reference to the accompanying drawings.

BRIEF DESCRIPTION OF THE DRAWINGS

The accompanying drawings show preferred embodiments of the present invention, in which:

FIG. 1 through FIG. 3 show a first embodiment, of which

FIG. 4 and FIG. 5 show a second embodiment of the present invention, of which

FIG. 7 and FIG. 8 show a fourth embodiment of the present invention, of which

FIG. 9 and FIG. 10 show a fifth embodiment of the present invention, of which

DETAILED DESCRIPTION OF THE INVENTION

A description is made below of each preferred embodiment of the present invention, with reference to the accompanying drawings.

Figure 1:
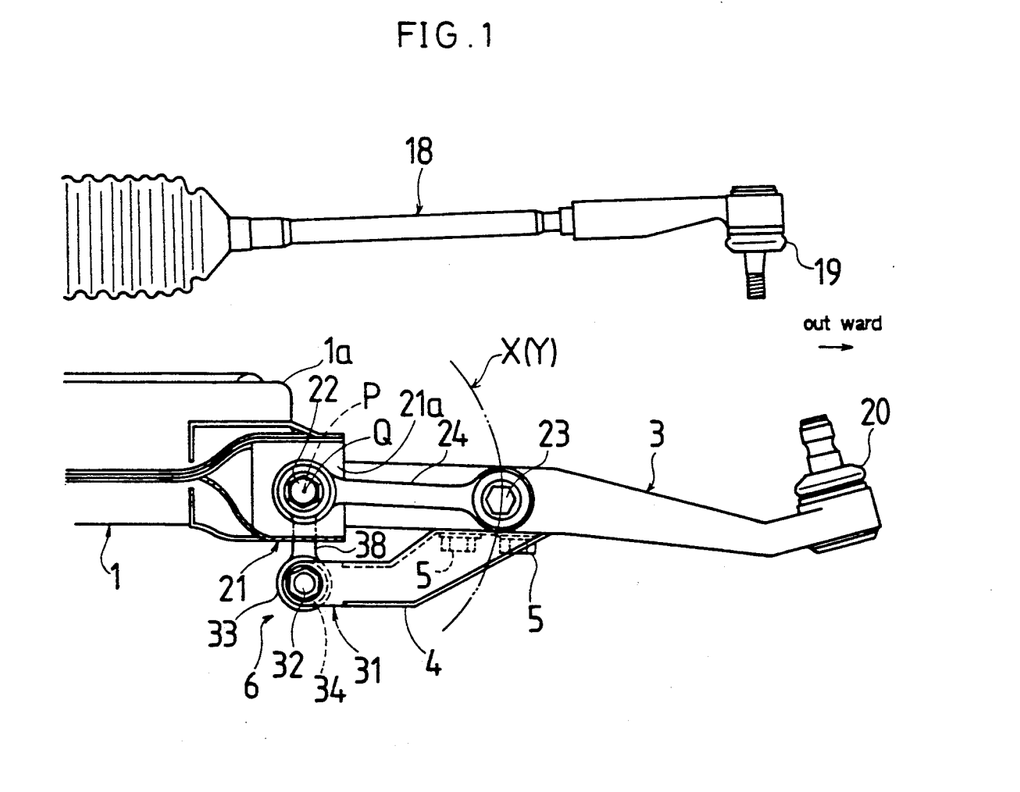
FIG. 1 is a front view of a suspension system on the right front wheel side, with the center of a vehicle body side support of a link member located on a horizontal line passing the center of a vehicle body side support of an assist link.
Figure 2:
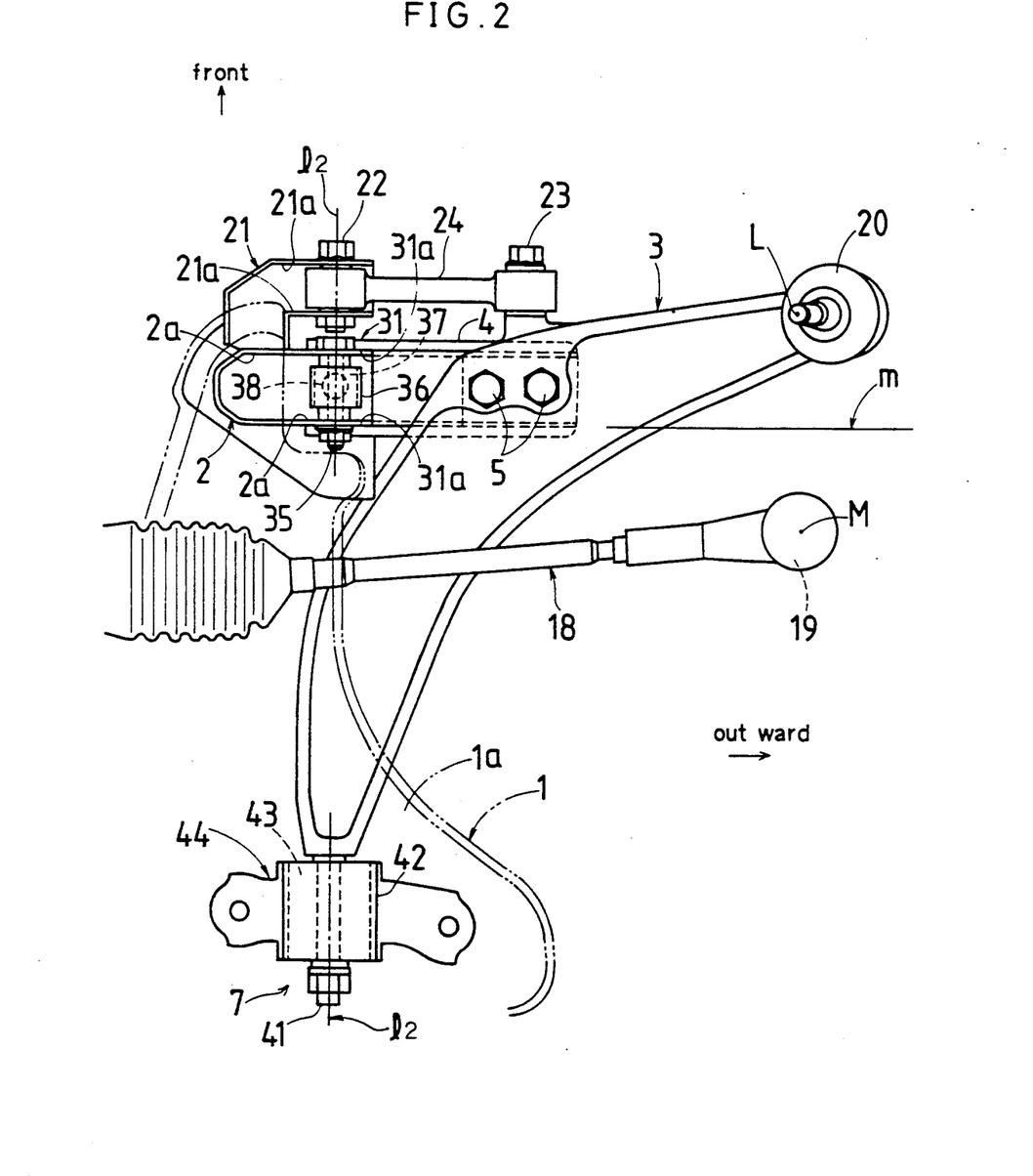
FIG. 2 is a plan view of the suspension system shown in FIG. 1.
Figure 3:
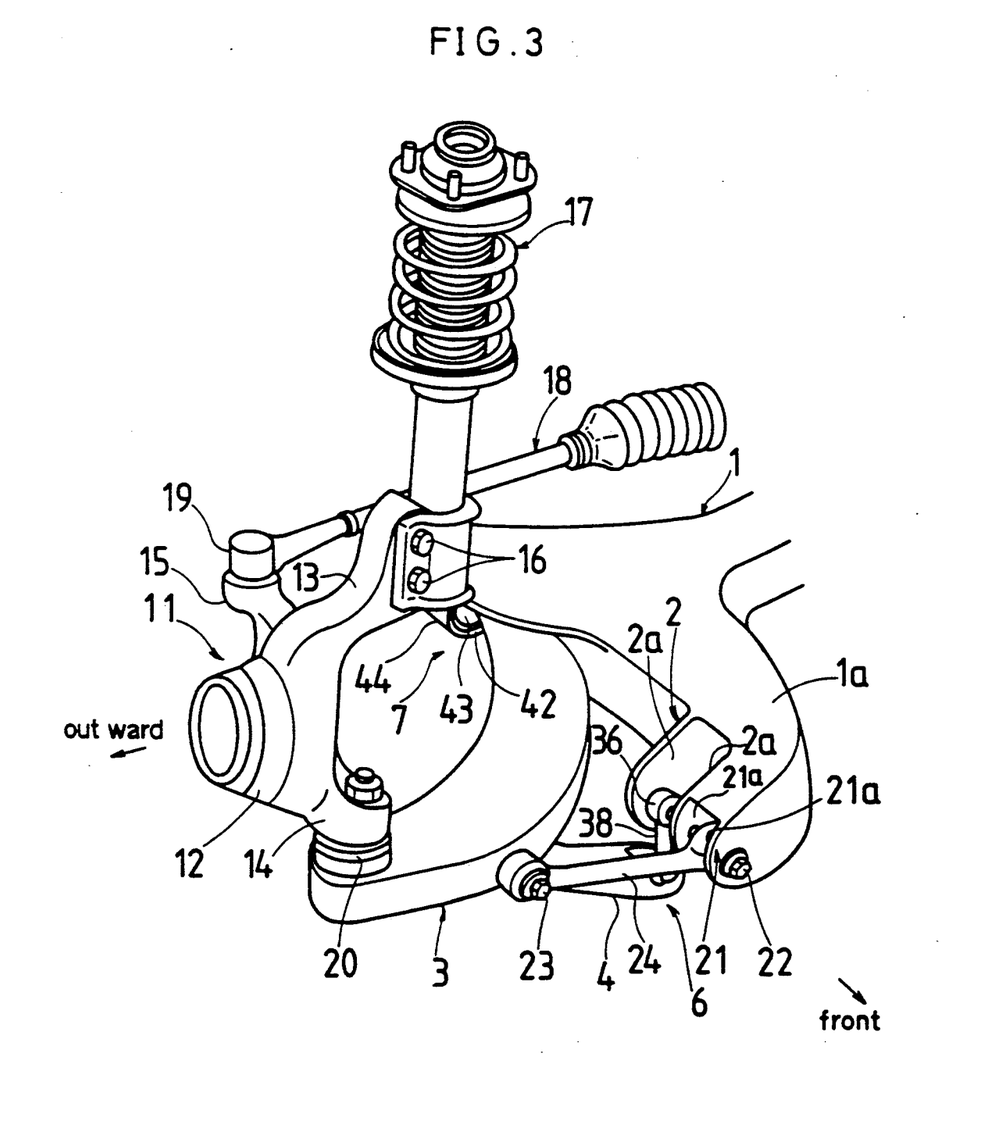
FIG. 3 is a perspective view of the suspension system shown in FIG. 1, as seen diagonally from the front.

FIG. 1 through FIG. 3 show a suspension system on the right front wheel side of a vehicle according to the first embodiment of the present invention. Reference numeral 1 designates a front cross member as a vehicle body member, extending in right and left direction of a vehicle, fitted to the vehicle body side. An extension part 1a extending in longitudinal direction of a vehicle body is provided at an end portion of the front cross member 1. Provided at the front end portion of the extension part 1a is a first bracket 2 (substantially ] shape in cross section) which opens to the outer side of the vehicle body (left side in the drawing). Provided outwardly of the side end of the front cross member 1 is a suspension arm member 3 of wishbone type (substantially quadrant in shape). An outer end of a projecting arm portion 4 which projects aslant, downwardly and inwardly of the vehicle body is fixed by bolts 5 to a substantially intermediate position of the undersurface of the suspension arm member 3 and thus A-type arm is composed. A vehicle body front side support part 6 is provided at the front end (inner end) of the projecting arm 4 of the suspension arm member 3 for supporting the front end to the first bracket 2 side (side of the front end portion) of the extension part 1a of the front cross member 1. Provided at the rear end portion (inner end portion) of the suspension arm member 3 is a vehicle body rear side support member 7 for supporting the rear end portion to the rear end portion side of the extension part 1a of the front cross member 1.

Provided outwardly of the suspension arm member 3 is a wheel support member 11 to support a right front wheel (not shown in the drawing). The wheel support member 11 comprises a wheel support part 12 of tubular shape, an upward extension part 13 projecting from the upper end of the wheel support part 12 in diagonal and upward direction, a front side extension part 14 projecting from the front end of the wheel support part 12 in diagonal and rearward direction and a rear side extension part 15 projecting from the rear end of the wheel support part 12 in diagonal and rearward direction. Provided at a top end of the upper side extension part 13 of the wheel support member 11 is a coil spring 17 which extends substantially in vertical direction and is fixed by bolts 16 at the lower end portion thereof. Supported at the top end (rear end portion) of the rear side extension part 15 of the wheel support member 11 through the medium of a first joint 19 of pivot type is a side end part of a tie rod 18 which extends in right and left direction of the vehicle body for pulling in or pushing out the rear side of the wheel support member 11 toward the inner side of the vehicle body and toward the outer side of the vehicle body respectively by manipulating a handle (not shown in the drawing). The outer end portion (front end portion) of the suspension arm member 3 is supported to the top end (front end portion) of the front side extension part 14 of the wheel support member 11 through the medium of a second joint 20. In this case, the second joint 20 which is a supporting point L of the top end of the front side extension part 14 of the wheel support member 11 and the outer end portion of the suspension arm member 3 (wheel side support point L of the suspension arm member 3) is located frontwardly of the central axis m (thin solid line shown in FIG. 2) of the rotation of the right front wheel. The first joint 19 which is the supporting point M of the top end of the front side extension part 15 of the wheel support member and the side end portion of the tie rod 18 is located rearwardly of the central axis m of the rotation of the right front wheel.

Provided at the front end (frontwardly of the vehicle front side support member 6) of the extension part 1a of the front cross member 1 is a second bracket 21 of ] shape in cross section opening to the outer side of a vehicle body. Provided at the intermediate part of the front end surface of the suspension arm member 3 (base end of the projecting arm part 4) is a hole part (not shown in the drawing) having an axis extending in front and rear direction. Provided at the front cross member 1 (front end of the extension part 1a) which is close to the front side support part 6 is an assist link 24 whose inner end portion is supported rotatably by a first binding bolt 22. This assist link 24 extends in right and left direction of the vehicle body and passes through between opposed surfaces 21a of the second bracket 21 of the front cross member 1. An outer end portion of the assist link 24 is supported rotatably by a second binding bolt 23 which is passed through the hole part of the suspension arm member 3.

The vehicle body front side support part 6 is provided with a bracket 31 (] shape in cross section) which is disposed at a top end of the projecting arm part 4 of the suspension arm member 3 and opens toward the inner side of the vehicle body, a first bolt member 32 which is passed through between opposed faces 31a of the bracket 31, a first outer tubular member 33 disposed outwardly of the first bolt member 32 and a first bush 34 arranged between the first bolt member 32 and the first outer tubular member 33. The first bracket 2 which is at a front end of the extension part 1a of the front cross member 1 corresponding to the vehicle body front side support part 6 has a second bolt member 35 with an axial center 11 extending in horizontal direction relative to the first bracket 2 (one-point chain line in FIG. 2 which also shows an axial center 11 of the second bush 37 to be described later), a second outer tubular member 36 disposed at the outer side of the second bolt member 35 and a second bush 37 disposed between the second bolt member 35 and the second outer tubular member 36. Connected to the first outer tubular member 33 of the vehicle body front side support part 6 of the suspension arm member 3 is a lower end portion of a link member 38 extending vertically and an upper end portion of the link member 38 is connected to the second outer tubular member 36 of the first bracket 2, whereby the link member 38 is supported swingably between the vehicle body front side support part 6 of the suspension arm member 3 and the first bracket 2. The vehicle body side supporting point Q which is the axial center of the first binding bolt 22 relative to the second bracket 21 of the assist link 24 is positioned on the axial center 11 of the second bolt member 35.

The vehicle body rear side support part 7 is provided with a third bolt member 41 which projects rearwardly from the rear end face of the suspension arm member 3 and has an axial center 12 (one-point chain line in FIG. 2) which also shows the axial center 12 of a third bush 43 to be described later, common with the axial center 11 of the second bolt member 35, a third outer tubular member 42 provided outwardly of the third bolt member 41, a third bush 43 arranged between the third bolt member 41 and the third outer tubular member 42, and a third bracket 44 which fixes the third outer tubular member 42 to the undersurface of a rear end portion of the extension part 1a of the front cross member 1. The suspension arm member 3 is supported swingably at two points spaced apart in longitudinal direction of the vehicle body, namely by the vehicle body front side support part 6 and the vehicle body rear side support part 7, to the extension part 1a of the front cross member 1.

In FIG. 1, X is a swinging locus in vertical direction which is drawn when the suspension arm member 3 swings through the medium of the link member 38 at bumping and Y is a swinging locus in vertical direction drawn by the assist link 24 at bumping. In this case, the swinging locus X drawn by the suspension arm member 3 and the swinging locus Y drawn by the assist link 24 coincide with each other, as seen from the direction of the axial center 11 of the second bush 37 of the suspension arm member 3 (axial center 12 of the third bush 43).

Therefore, in the above embodiment external force from right and left direction of a vehicle body which acts at turning of a vehicle body, for example, is supported by the suspension arm member 3 whose lateral rigidity is heightened effectively by the assist link 24 which extends in right and left direction of the vehicle body and accordingly driving stability at turning is improved.

In the above case, the vehicle body front side support part 6 close to the assist link 24 of the suspension arm member 3, namely, the first bolt member 32 of the bracket 31 (] shape in cross section) at the top end of the projecting arm part 4 is supported swingably to the first bracket 2 of the front cross member 1 (extension part 1a) through the medium of the like member 38 extending in vertical direction and therefore if external force from the lengthwise direction of vehicle body acts on the suspension arm member 3 when the vehicle runs over roughness of the road, for example, the vehicle body front side support part 6 of the suspension arm member 3 swings in longitudinal direction with the second outer tubular member 36 (supporting point on the vehicle body side of the link member 38) as fulcrum. Accordingly, rigidity against input from the longitudinal direction of the vehicle body at the vehicle body front side support part 6 close to the assist link 24 of the suspension arm member 3 becomes low and the quantity of moving the wheel in front and rear direction against input from the longitudinal direction of vehicle body increases, with the result that compliance in front and rear direction is ensured fully and comfortableness to ride in against input from the front and rear direction is enhanced effectively. Thus, coexistence of comfortableness to ride in when running over roughness of the road and driving stability at turning can be realized at a high level.

The present invention is not limited to the above first embodiment but includes various modified embodiments, for example, the above embodiment refers to the case where the assist link is provided at the vehicle body front side support part 6 of the suspension arm member 3 but it is a matter of course that the present invention is applicable to the case where the assist link is provided at the vehicle body rear side support part of the suspension arm member. In this case, the link member is to be provided at the vehicle body rear side support part.

Also, the above embodiment refers to the case where the link member 38 is provided at the vehicle body front side support part 6 close to the assist link 24 but it is a matter of course that the vehicle body rear side support part which is away from the assist link can be fitted to the front cross membe through the medium of the link member.

Furthermore, the above embodiment refers to the case where the wheel side support L of the suspension arm member 3 is located frontwardly of the central axis m of the rotation of the front wheel but the present invention is applicable to the case where the supporting point of the wheel support member and the side end portion of the tie rod is located frontwardly of the central axis of the rotation of the right front wheel and wheel side supporting point of the suspension arm member is located rearwardly of the center of rotation of the wheel.

In addition, the above embodiment refers to the case where the assist link 24 and the link member 38 are provided at the suspension arm member 3 of wishbone type but the present invention is applicable to the suspension of bouble wishbone type, strut type, etc. Also, the above embodiment refers to the case where the present invention is applied to the right side front wheel of the vehicle body, namely, the front suspension but the present invention is applicable to a rear suspension.

A description is made below of the second embodiment of the present invention.

Figure 4:
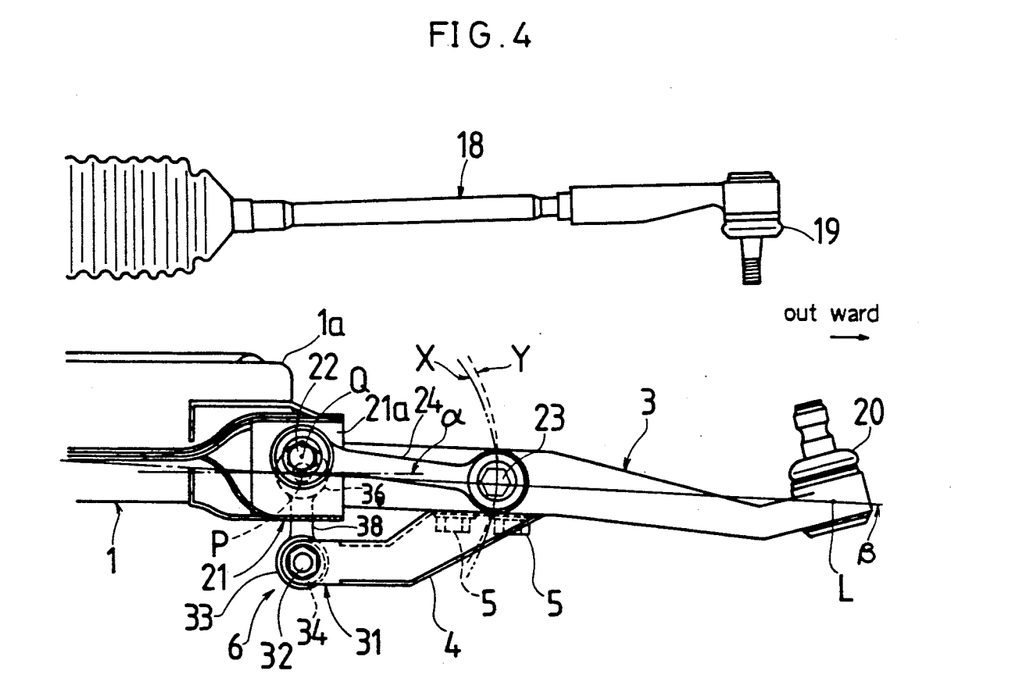
FIG. 4 is a front view of a suspension system on the right front wheel side, with the center of a vehicle body side support of a link member located eccentrically below a horizontal line passing a center of a vehicle body side support of an assist link.
Figure 5:
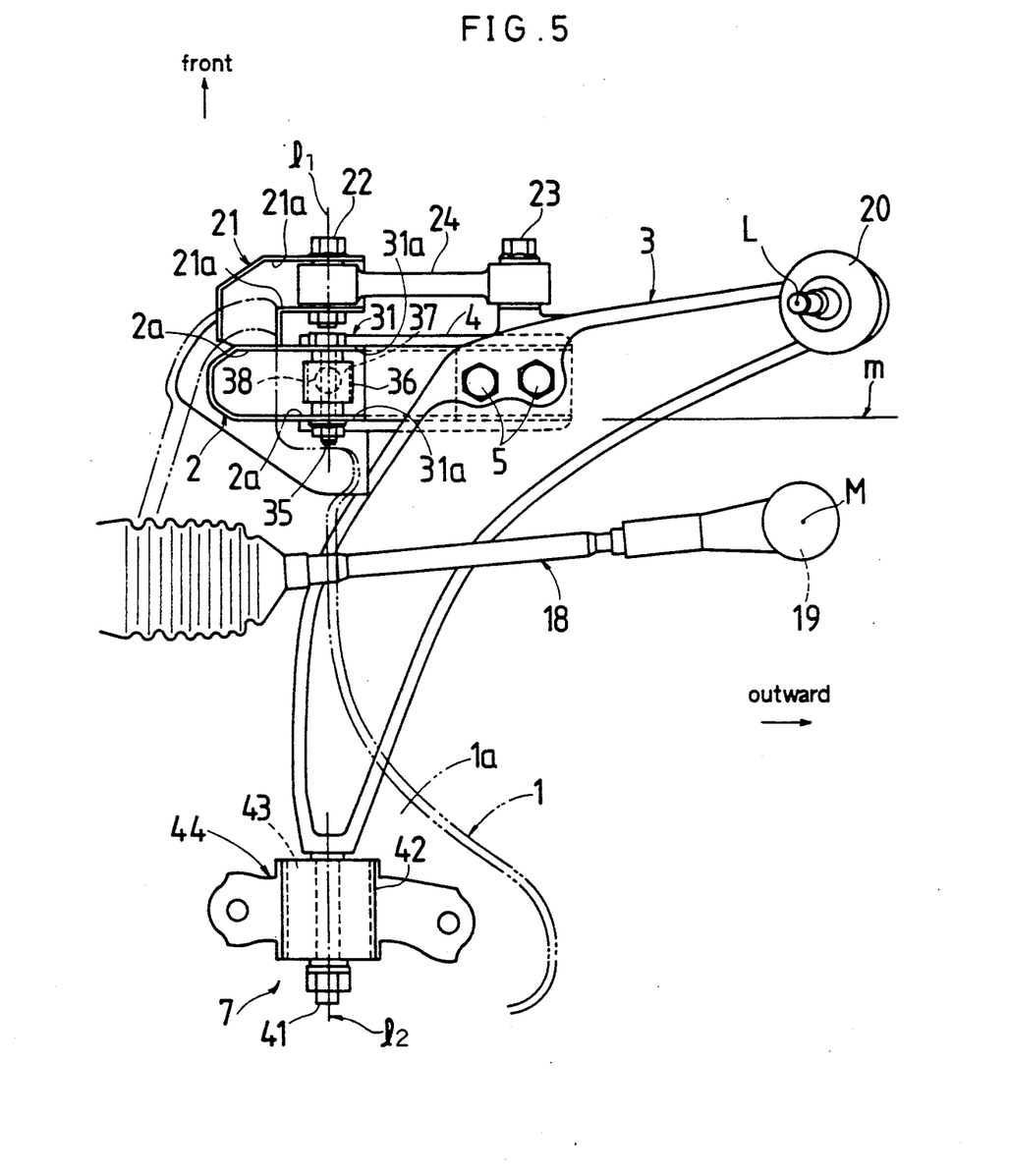
FIG. 5 is a plan view of the suspension system shown in FIG. 4.

FIG. 4 and FIG. 5 show the second embodiment of the present invention (for each of the following embodiments, parts which are the same as those in FIG. 2 and FIG. 3 are given the same reference numerals and description thereof is omitted), wherein the vehicle body side support center of the link member is made eccentric to the vehicle body side support center of the assist link. More particularly, the vehicle body side support center P of the link member 38 which is the axial center of the second bolt member 35 to the first bracket 2 is eccentric downwardly of the horizontal line α (one-point chain line shown in FIG. 4) which extends in right and left direction of the vehicle body, passing the vehicle body side support center Q of the assist link 24 which is the axial center of the first binding bolt 22 to the second bracket 21, as seen from the axial center 11 (axial center 12 of the third bush 43) of the first bush 34.

In this embodiment, since the vehicle body front side support part 6 of the suspension arm member 3, namely, the vehicle side support center P of the link member 38, is eccentric to the support center Q, as seen from the direction of the axial center 11 of the first bush 34 (axial center 12 of the third bush 43), at bumping of a turning tire the swinging locus X (two-dot chain line in FIG. 4) in vertical direction with the vehicle body side support center P of the link member 38 as fulcrum is different from the swinging locus Y (broken line in FIG. 4) in vertical direction with the vehicle body side support center Q as fulcrum. Therefore, the swinging locus X of the suspension arm member 3 is controlled by the swinging locus Y of the assist link 24 and the toe control on a turning tire at bumping is changed positively, with the result of enlargement of the degree of its freedom. Moreover, as the swinging locus X of the suspension arm member 3 with the vehicle body side support center P of the link member 38 as fulcrum is controlled by the swinging locus Y of the assist link 24 as mentioned above, in the case where the vehicle body side support center P of the link member 38 is eccentric in vertical direction to the horizontal line α which passes the vehicle side support center Q, a roll center to be obtained with the extension β, extending from the vehicle body side support center (vehicle body side support center P of the link member 38) to the wheel side support center L, as a requisite is changed in setting in vertical direction by the vehicle body side support center Q of the assist link 24 which is positioned in vertical direction relative to the vehicle body side support center P of the link member 38 and therefore roll characteristic of a turning tire at bumping is changed, with the result of enlargement of the degree of its freedom.

In the above case, since the vehicle body side support center P of the link member 38 is eccentric downwardly of the horizontal line α passing the vehicle body side support center Q of the assist link 24, as seen from the axial center 11 direction of the first bush 34, the swinging locus X of the suspension arm member 3 with the vehicle body side support center P of the link member 38 as fulcrum is to be controlled by the swinging locus Y of the assist link 24. Thus, the front part side of the turning tire at bumping is pushed to the outer side of the vehicle body because the wheel side support center L is located frontwardly of the central axis m of the rotation of the wheel with the result that the toe control is changed positively to the toe-out and the understeer tendency which enhances driving stability at turning can be set.

As stated above, since the swinging locus X in vertical direction of the suspension arm member 3 with the vehicle body support center P of the link member 3 which is eccentric downwardly to the horizontal line α passing the vehicle body side support center Q of the assist link 24 as fulcrum is controlled by the swinging locus Y in vertical direction of the assist link 24 with the vehicle body side support center Q of the assist link 24 as fulcrum, the roll center at turning is changed in setting by the vehicle body side support center Q of the assist link 24 which is positioned above the vehicle body support center P of the link member 38 in such a fashion that it is away, in vertical direction, from the center of gravity of the vehicle body so that roll characteristic can be set to such a tendency that priority is given to comfortableness to ride in at turning by enlarging the rolling quantity so as to enlarge jolting of the vehicle body.

In the above embodiment, reference is made to the case where the wheel side support point L of the suspension arm member 3 is positioned forwardly of the central axis m of the rotation of the wheel but it is a matter of course that present invention is applicable to the case where a joint between the wheel support member 11 and a side end portion of the tie rod 18 (the first joint 19) is provided forwardly of the central axis of the rotation of the right front wheel and the wheel side supporting point of the suspension arm member 3 is positioned rearwardly of the central axis of the rotation of the wheel. In this case, the rear side of the turning tire at bumping is pushed to the outer side of the vehicle body and toe control is changed positively to toe-in, with the result that oversteer tendency (turning ability at turning is enhanced) can be set.

A description is made below of the third embodiment of the present invention.

Figure 6:
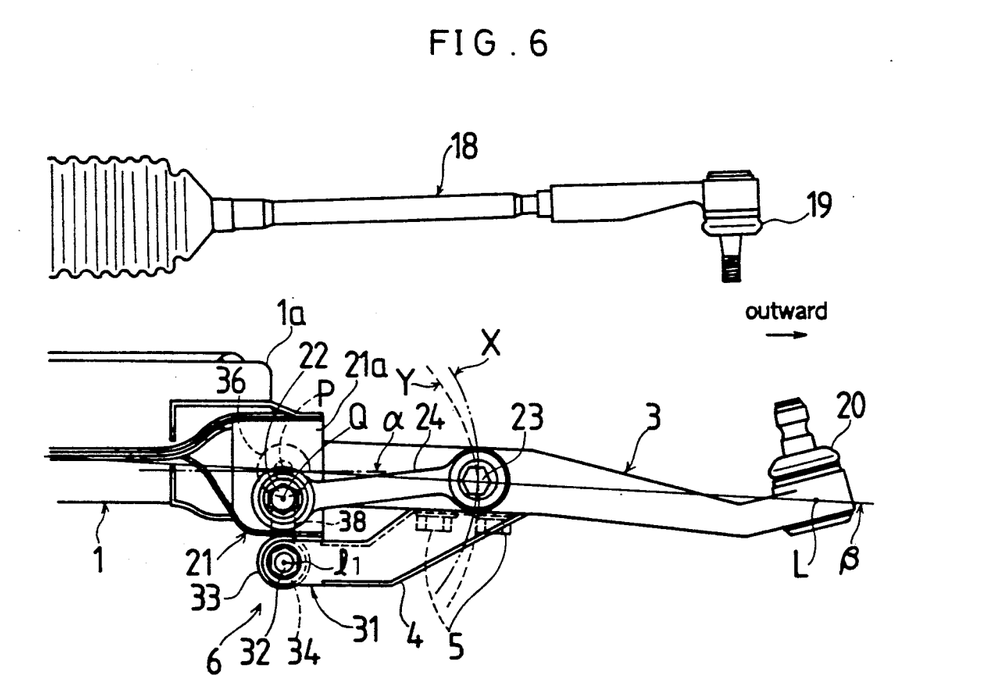
FIG. 6 shows a third embodiment of the present invention and is a front view of a suspension system on the right front wheel side, with the center of a vehicle body side support of a link member located eccentrically above a horizontal line passing the center of a vehicle body side support of an assist link.

FIG. 6 shows the third embodiment of the present invention. This embodiment refers to the case where the position at which the vehicle body side support center P of the link member 38 is eccentric to the vehicle body side support center Q of the assist link 24 is changed. More particularly, the vehicle body side support center P of the link member 38 is made eccentric upwardly to the horizontal line α extending in right and left direction and passing the vehicle body side support center Q of the assist link 24, as seen from the direction of axial center 11 of the first bush 34.

In the above case, the swinging locus X (two-point chain line in FIG. 6) of the suspension arm member 3 with the vehicle body side support center P of the link member 38 as fulcrum is controlled by the swinging locus Y (broken line in FIG. 6) of the assist link 24 with the vehicle body side support center Q located downwardly of the vehicle body side support center P of the link member 38 as fulcrum. Therefore, the front part side of the turning tire at bumping is drawn toward the inner side of the vehicle body due to the wheel side support point L of the suspension arm member 3 being positioned frontwardly of the rotation center m of the wheen and the toe control is changed positively to toe-in, with the result that the oversteer tendency (turning ability at turning is enhanced) can be set.

As stated above, since the swinging locus X in vertical direction of the suspension arm member 3 with the vehicle body side support center P of the link member 3 which is made eccentric upwardly to the horizontal line α passing the vehicle body side center Q of the assist link 24 as fulcrum is controlled by the swinging locus Y in vertical direction of the suspension arm member 3 with the vehicle body side support center Q of the assist link 24 as fulcrum, the roll center at turning is changed in setting in such a fashion that it approaches, in vertical direction, the center of gravity of a vehicle body, with the result that the roll characteristic can be set to such a tendency that priority is given to driving ability at turning by lessening the rolling quantity so as to lessen jolting of a vehicle body.

In this third embodiment, too, reference is made to the case where the wheel side support point L of the suspension arm member 3 is positioned frontwardly of the central axis m of the rotation of the wheel but it is a matter of course that the present invention is applicable to the case where a joint between the wheel support member and a side end portion of the tie rod is provided frontwardly of the central axis of the rotation of the right wheel and the wheel side support point of the suspension arm member is positioned rearwardly of the central axis of the rotation of the wheel. In this case, the rear part side of the turning tire at bumping is drawn toward the inner side of the vehicle body and the toe control is changed positively to toe-out, with the result that understeer tendency (driving stability at turning is enhanced) can be set.

A description is made below of the fourth embodiment of the present invention.

Figure 7:
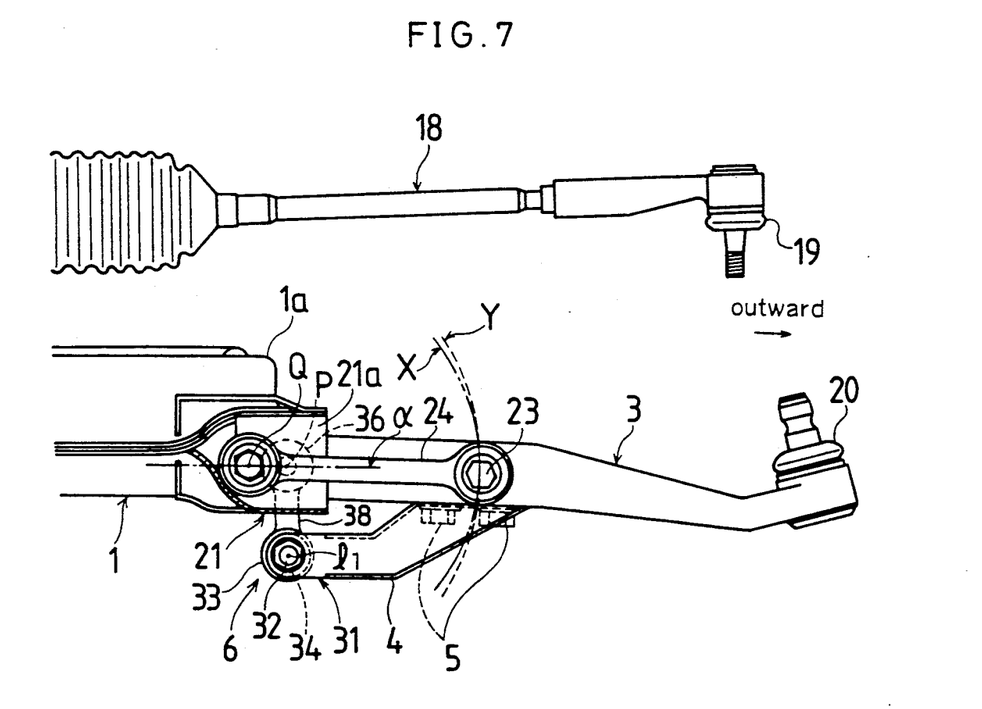
FIG. 7 is a front view of a suspension system on the right front wheel side, with the center of a vehicle body side support of a link member located eccentrically to the outer side of a vehicle body relative to the center of a vehicle body side support on a horizontal line passing the center of a vehicle body side support of an assist link.
Figure 8:
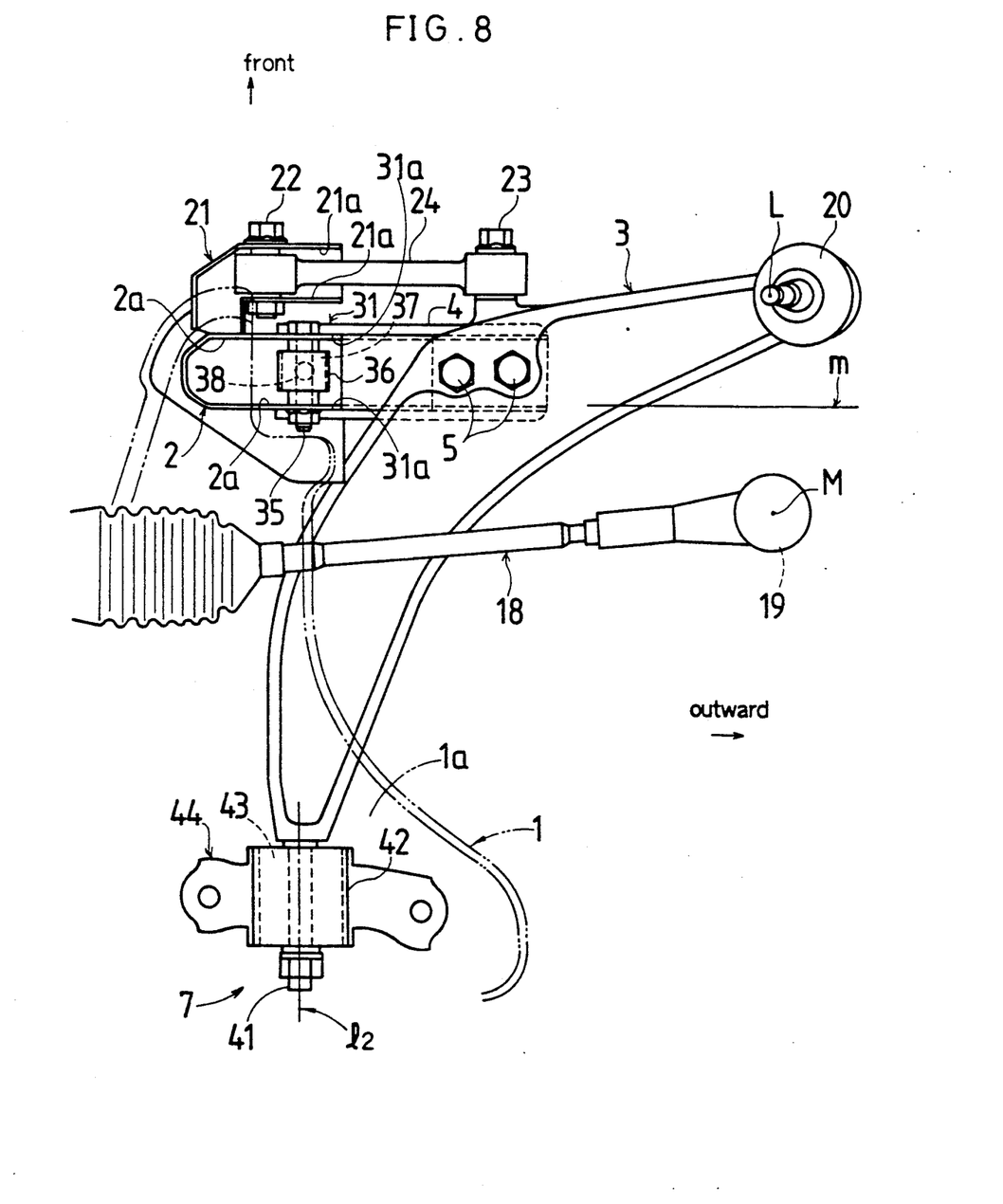
FIG. 8 is a plan view of the suspension system shown in FIG. 7.

FIG. 7 and FIG. 8 show the fourth embodiment of the present invention. This embodiment refers to the change in the position at which the vehicle body side support center of the link member is eccentric to the vehicle body side support center of the assist link. More particularly, the vehicle body side support center P is made eccentric to the outer side of the vehicle body relative to the vehicle body support center Q on the horizontal line α extending in right and left direction of the vehicle body and passing the vehicle side support center Q of the assist link 24, as seen from the direction of axial center 11 of the first bush 34.

In the above case, the swinging locus X (two-dot chain line in FIG. 7) of the suspension arm member 3 with the vehicle body side support center P of the link member 38 as fulcrum is controlled by the swinging locus Y (broken line in FIG. 7) of the assist link 24 with the vehicle body support center Q which is positioned at the inner side of the vehicle body relative to the vehicle body side support center of the link member 38 (as seen from the front) on the horizontal line α passing the vehicle body side support center P as fulcrum. Therefore, the front part side of the turning tire at bumping is pushed to the outer side of the vehicle body due to the wheel side support center L of the suspension arm member being positioned frontwardly of the central axis m of the rotation of the wheel and the toe control is changed positively to the toe-out, with the result that the understeer tendency (driving stability at turning in enhanced) can be set.

In this fourth embodiment, too, reference is made to the case where the wheel side support point L of the suspension arm member 3 is positioned frontwardly of the central axis m of the rotation of the wheel but it is a matter of course that the present invention is applicable to the case where a joint between the wheel support member and a side end portion of the tie rod is provided frontwardly of the rotation center of the right front wheel and the wheel side support point of the suspension arm member is positioned rearwardly of the central axis of the rotation of the wheel. In this case, the rear part side of the turning tire at bumping is pushed to the outer side of the vehicle body and the toe control is changed positively to the toe-in and the oversteer tendency (turning ability at turning is enhanced) can be set.

A description is made of the fifth embodiment of the present invention.

Figure 9:
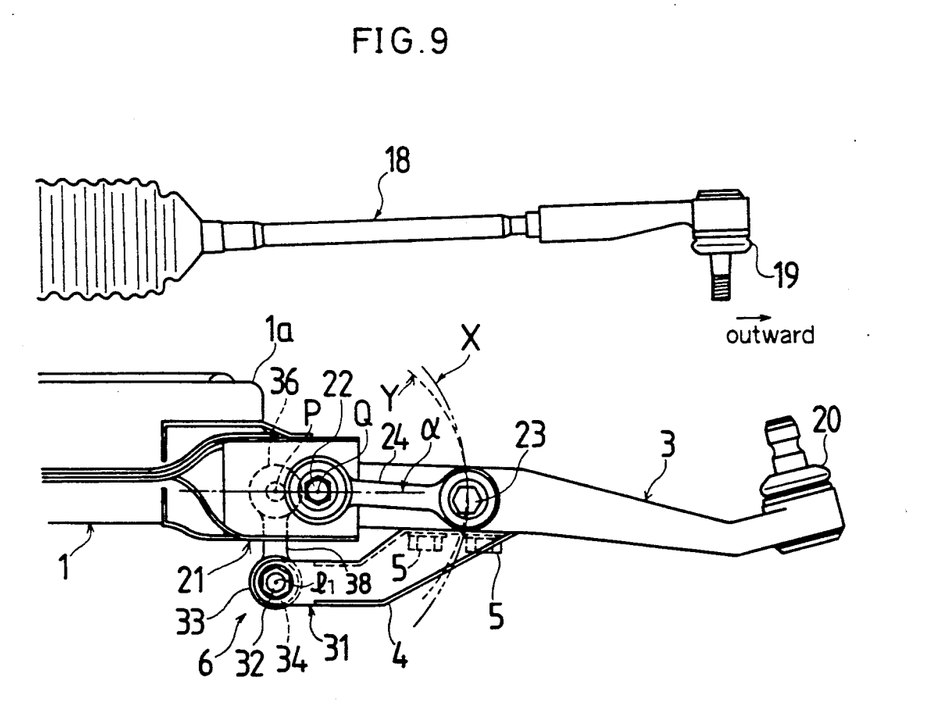
FIG. 9 is a front view of a suspension system on the right front wheel side, with the center of vehicle body side support of a link member located eccentrically to the inner side of vehicle body side support on a horizontal line passing the center of a vehicle body side support of an assist link.
Figure 10:
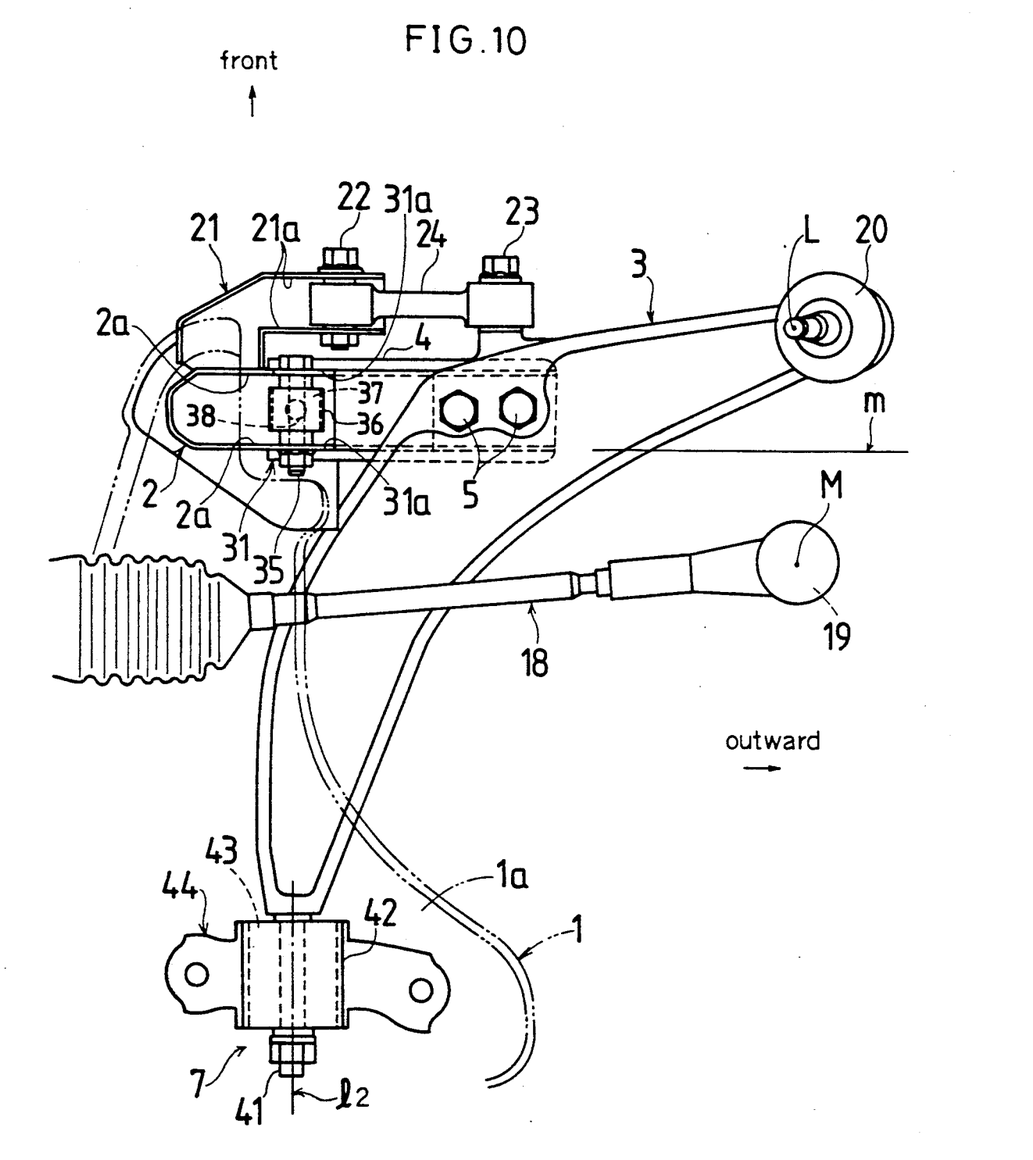
FIG. 10 is a plan view of the suspension system shown in FIG. 9.

FIG. 9 and FIG. 10 show the fifth embodiment of the present invention. This embodiment refers to the change in position at which the vehicle body side support center P of the link member 38 is made eccentric to the inner side of the vehicle body relative to the vehicle body side support center Q of the assist link 24 on the horizontal line α extending in right and left direction of the vehicle body and passing the vehicle body side support center Q of the assist link 24, as seen from the direction of axial center 11 of the first bush 34.

In the above case, the swinging locus X (two-dot chain line in FIG. 9) of the suspension arm member 3 with the vehicle body side support center P of the link member 38 as fulcrum is controlled by the swinging locus Y (broken line in FIG. 9) with the vehicle body side support center Q which is located outer side of the vehicle body relative to the vehicle body side support center P on the horizontal line α passing the vehicle body side support center P of the link member as fulcrum. Therefore, the front part side of the turning tire at bumping is drawn to the inner side of the vehicle body due to the wheel side support point L of the suspension arm member 3 being positioned frontwardly of the central axis m of the rotation of the wheel and the toe control is changed positively to the toe-in and the oversteer tendency (turning ability at turning is enhanced) can be set.

In this fifth embodiment, too, reference is made to the case where the wheel side support point L of the suspension arm member 3 is positioned frontwardly of the central axis m of the rotation of the wheel but it is a matter of course that the present invention is applicable to the case where a joint between the wheel support member and a side end portion of the tie rod is provided frontwardly of the rotation center of the right front wheel and the wheel side support point of the suspension arm member is positioned rearwardly of the central axis of the rotation of the wheel. In this case, the front part side of the turning tire at bumping is drawn to the inner side of the vehicle body and the toe control is changed positively to the toe-out and the understeer tendency (driving stability at turning is enhanced) can be set.

What is claimed is:
1. A suspension system for a vehicle comprising:
 a suspension arm member, first and second support members for mounting said suspension arm member on a vehicle body cross member, a wheel support member mounted for rotation on said suspension arm member, and an assist link, said first and second support members being spaced from one another longitudinally of said vehicle and joining said suspension arm member to said vehicle body cross member such that said suspension arm member can pivot about an axis extending horizontally and longitudinally of said vehicle;
 said assist link extending transversely of said vehicle between said cross member and an intermediate point on said suspension arm member of enhance the lateral rigidity of said suspension arm member and being pivotally mounted at one end to said intermediate point on said suspension arm member and being pivotally mounted at its other end to said vehicle body cross member such that the end of said assist link mounted to said cross member pivots about said axis about which said support members pivot;

said second support member including a support arm joined to the underside of said suspension arm member and extending downwardly thereof and transversely of said vehicle, a vertically extending linkage connecting said support arm to said vehicle body cross member, a first end of said linkage being pivotally mounted to said vehicle body cross member and a second end of said linkage being pivotally mounted to the downwardly extending end of said support arm such that said first end of said linkage may pivot about a horizontal axis running longitudinally of said vehicle, said linkage also permitting said suspension arm member to move transversely.

2. A suspension system for a vehicle as set forth in claim 1 wherein said axis about which said first end of said vertically extending linkage pivots is concentric with said axis about which said assist link pivots.

3. A suspension system for a vehicle as set forth in claim 1 wherein said second support member is positioned frontwardly of said first support member.

4. A suspension system for a vehicle comprising:
a suspension arm member, first and second support members for mounting said suspension arm member on a vehicle body cross member, a wheel support member mounted for rotation on said suspension arm member, and an assist link;
said first and second support members being spaced from one another longitudinally of said vehicle and joining said suspension arm member to said vehicle body cross member;
said wheel support member being at a position on said support arm offset from the central axis of rotation of a wheel mounted on said support member;
said first support member mounting said suspension arm member to said vehicle body cross member through a bushing having an axial center extending horizontally and longitudinally of said vehicle;
said assist link extending transversely of said vehicle between said cross member and an intermediate point on said suspension arm member to enhance the lateral rigidity of said suspension arm member and being pivotally mounted at one end to said intermediate point on said suspension arm member and being pivotally mounted at its other end to said vehicle body cross member such that the end of said assist link mounted to said cross member pivots on an axis approximately concentric with said axis about which said first support member pivots;

said second support member including a support arm joined to the underside of said suspension arm member and extending downwardly thereof and transversely of said vehicle body, a vertically extending linkage connecting a downwardly extending end of said support arm to said vehicle body cross member through a bushing having an axial center through which said vertically extending linkage pivots extending horizontally and longitudinally of said vehicle and being approximately concentric with the axis about which said first support member pivots and being eccentric to said axis about which said assist link pivots.

5. A suspension system for a vehicle as set forth in claim 4 wherein said axial center about which said vertically extending linkage pivots is downwardly eccentric with respect to the axis about which said assist link pivots.

6. A suspension system for a vehicle as set forth in claim 4 wherein said axial center about which said vertically extending linkage pivots is upwardly eccentric with respect to the axis about which said assist link pivots.

7. A suspension system for a vehicle as set forth in claim 4 wherein said axial center about which said vertically extending linkage pivots is outwardly eccentric with respect to the axis about which said assist link pivots.

8. A suspension system for a vehicle as set forth in claim 4 wherein said axial center about which said vertically extending linkage pivots is inwardly eccentric with respect to said axis about which said assist link pivots.

9. A suspension system for a vehicle as set forth in claim 1, wherein said suspension arm member is of A-type construction.

10. A suspension system for a vehicle as set forth in claim 4, wherein said suspesnion arm member is of A-type construction.

* * * * *